United States Patent [19]

Peters et al.

[11] Patent Number: 5,017,312

[45] Date of Patent: May 21, 1991

[54] ORIENTED CHOPPED FIBER MATS AND METHOD AND APPARATUS FOR MAKING SAME

[75] Inventors: Thomas E. Peters, Boise, Id.; James D. Logan, Pullman, Wash.; Eugene R. Bennett, Boise, Id.; Clarence L. Dieter, Boise, Id.; David J. Henckel, Boise, Id.

[73] Assignee: The Coe Manufacturing Company, Painesville, Ohio

[21] Appl. No.: 43,093

[22] Filed: Apr. 27, 1987

Related U.S. Application Data

[63] Continuation-in-part of Ser. No. 686,840, Dec. 27, 1984, Pat. No. 4,664,856.

[51] Int. Cl.⁵ .......................... D04H 1/74; D04H 1/64
[52] U.S. Cl. .......................................... 264/24; 19/296; 264/108; 361/226; 425/174.8 E; 428/288; 428/290; 428/294; 428/338
[58] Field of Search .................. 361/226; 264/24, 108

[56] References Cited

U.S. PATENT DOCUMENTS

| | | | |
|---|---|---|---|
| 3,843,756 | 10/1974 | Talbott et al. | 264/24 |
| 4,432,916 | 2/1984 | Logan | 264/24 |
| 4,664,856 | 5/1987 | Talbott et al. | 162/192 |

OTHER PUBLICATIONS

Selo et al., "Antistatic Treatments", pp. 291–298 in Chap. 4 of Handbook of Fiber Science and Technology: vol. II Chemical Processing of Fibers and Fabrics—*Functional Finishes* Part B, Lewis et al., Edits, Marcel Dekker, Inc., New York, N.Y. (1984).

*Primary Examiner*—James C. Cannon
*Attorney, Agent, or Firm*—Klarquist, Sparkman, Campbell, Leigh & Whinston

[57] ABSTRACT

Apparatus for the manufacture of oriented chopped glass fiber mats from non-conductive fiber feed stock is disclosed. Apparatus includes means for increasing the conductance of the feed stock, electrically insulative transfer surface; means for establishing and maintaining a directional electric field to orient the chopped fibers, and a mat receiving surface to receive the oriented mat. The non-woven mat comprises a plurality of cut or chopped fibers having their longitudinal axes predominately disposed approximately parallel to a predetermined orientation axis lying in the plane of the mat. A preferred embodiment includes the incorporation of a glass fiber mat into a composite by applying a matrix resin to the mat in sufficient quantity to ensure the integrity of the composite. The process for manufacturing said non-woven oriented mats is also disclosed.

17 Claims, 2 Drawing Sheets

U.S. Patent  May 21, 1991  Sheet 1 of 2  5,017,312
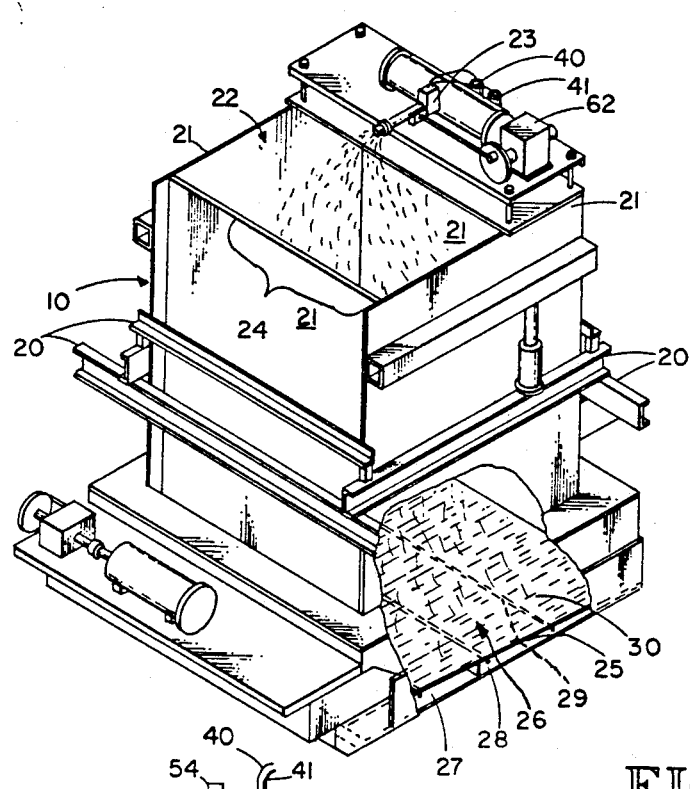
FIG. 1
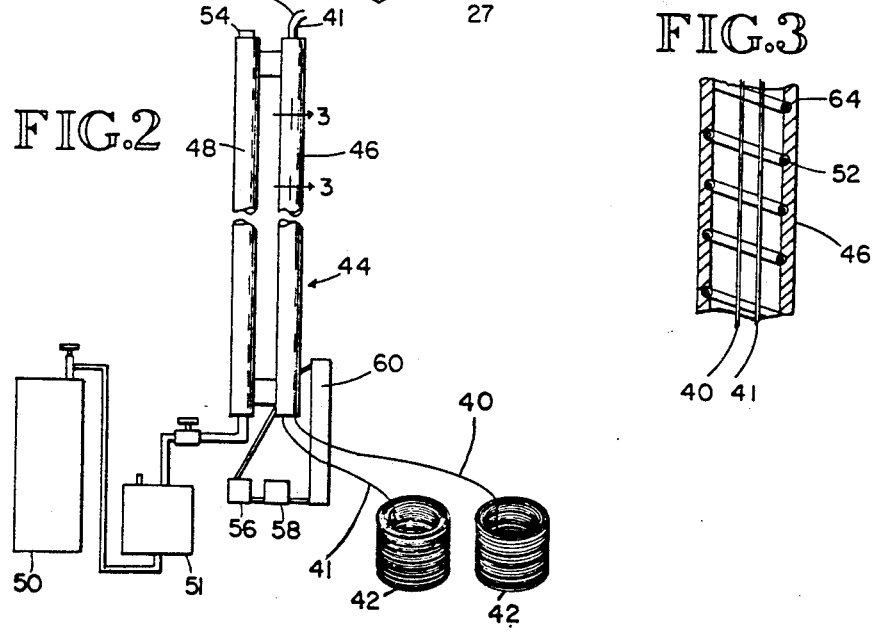
FIG. 2
FIG. 3

ORIENTED CHOPPED FIBER MATS AND METHOD AND APPARATUS FOR MAKING SAME

RELATED APPLICATION

This application is a continuation-in-part of application Ser. No. 686,840, filed Dec. 27, 1984, now U.S. Pat. No. 4,664,856, issued May 12, 1987.

DESCRIPTION

1. Technical Field

The present invention relates to an oriented, nonwoven, chopped fiber mat exhibiting substantial improvements in directional strength over prior art random chopped fiber mats. It additionally includes methods and apparatus for making such oriented chopped fiber mats.

2. Background Art

It is common practice in many industries to employ plastic components and parts reinforced with chopped nonconductive fibers. These industries include the automobile, marine, pipe, and residential and commercial construction industries. Typically, a chopped fiber mat is impregnated with a plastic resin, frequently referred to as "matrix," and cured to provide the desired fiber-reinforced laminate.

Chopped glass fiber mats, which are nonwoven fabric matrices consisting of strands of glass fibers chopped into a desired length, are commonly employed. These chopped glass fibers are deposited at random in a horizontal plane and held together by means of a suitable adhesive. Adhesives can be powdered fuseable polyesters and plasticized polyvinyl acetate emulsions. Physical properties of these mats are governed by fiber size, and type and quantity of adhesive. Because the orientation of the reinforcing chopped glass fibers is random and nonoriented, structural components employing such mats exhibit uniform, isotropic tensile and flexural strength.

In many industries, such as the automobile industry, a need has developed to provide glass fiber-reinforced plastic components which exhibit directional strength characteristics. This need has evolved in part through a desire to produce lighter weight components. Prior art application of chopped glass fiber-reinforced plastic components dictated that dimensions and mass of the components are selected to satisfy directional strength requirements. Unfortunately, these prior art glass fiber composites exhibit relatively isotropic strength characteristics, resulting in unnecessary increases in weight, strength and cost.

Alternatively, prior art methodologies utilized knitted and woven glass fibers to impart directional strength characteristics to a given structural component.

Methods are known for directionally orienting products of reconstituted lignocellulosic materials such as strands, splinters, flakes, particles, fibers, etc. The production of directionally oriented products from lignocellulosic materials by electrostatic orientation of discrete pieces of lignocellulosic material is described in U.S. Pat. Nos. 4,284,595; 4,287,140; 4,323,338 and 4,347,202. In these prior art systems, the lignocellulosic material is dried to a moisture content of between 4.5% to 10% on a dry weight basis. The dried material is metered into a former which distributes the lignocellulosic material between spaced electrically charged plates for alignment of the particles in the direction of the electric field as they descend by gravity between the charged plates. These oriented particles are then deposited on a mat-receiving surface for later consolidation under heat and pressure in a press.

Unfortunately, these prior art methodologies cannot be employed to produce oriented chopped fiber mats where the fibers are nonconductive. The term "nonconductive," as used herein, is defined as conductances less than 0.2 picosiemens. For example, typical glass fibers made from roving or cakes and serving as the feedstock for chopped glass fiber mats exhibit insufficient conductivity to respond to the orientation of an electric field.

The present inventors have found that orientation of glass fibers in an electric field is possible where the conductance of glass fibers is increased to at least 0.2 picosiemens. As used herein, the term "conductance" is defined as the reciprocal of electrical resistance of a chopped fiber. This term refers to measurements which were taken by means of a pair of biased metallic electrical contacts placed at a distance of about 25 millimeters along the major axis of the elongated chopped fiber. In the case of glass fibers, conductance is measured by placing entire roving between clips of conductivity meter. Yield of typical glass fiber roving is 205 yd/lb. An electrical potential, V, is maintained between the contacts and the electric current, I, flowing from one contact through the fiber to the other contact is measured Conductance G was calculated from the formula: $G = I/V$.

It is recognized that conductivity varies according to the formula: Conductivity = $G$ (L/wh), where L is the distance between the contacts, and w and h are the width and thickness, respectively, of the fiber. In the case of the fibers considered here, the term (L/wh) typically varies over a range of about 100 to 1, while the conductance, G, varies over a much wider range, often in excess of 10,000:1. It was therefore convenient to ignore the effect of variations in fiber geometry, i.e., L/wh, and report only the conductance.

Consequently, it would be advantageous to provide methods and apparatus for predictably and uniformly enhancing the conductivity of nonconductive fibers such as glass fibers in order to produce oriented chopped fiber mats. The methods and apparatus disclosed herein are generally applicable to other nonconductive synthetic or natural fibers, such as polypropylene, extended chain polyethylene, aramid, polyamide, acronitrile, nylon, rayon, cotton, jute, sisal, wood, boron, ceramic and asbestos.

DISCLOSURE OF THE INVENTION

It is a primary object of the present invention to provide a process of manufacturing a nonwoven mat from electrically nonconductive fiber feedstock. The process, comprises the steps of increasing the conductivity of the roving feedstock to range from 0.2 picosiemens to 10 nanosiemens, chopping the feedstock into fibers of a predetermined length, causing said chopped fibers to fall under the influence of gravity through a directional electric field of sufficient strength to orient the fibers substantially parallel to a predetermined orientation axis, and collecting the oriented fibers on a transfer surface to create an oriented, nonwoven mat.

A preferred fiber feedstock for such process is glass fiber roving; however, other nonconductive fiber feedstock may be substituted.

The preferred method for increasing the electrical conductivity of the feedstock comprises passing the feedstock through a temperature- and humidity-controlled chamber to condense moisture on such feedstock. Alternatively, the feedstock may be pretreated with a conductivity-enhancing compound selected from the group consisting of the salts of weak acids, acetates, borates, fatty acid amides, ammonium salts of weak acids, and quaternary ammonium compounds containing inorganic radicals. Alternatively, the conductivity may be increased by exposure to a gas which is ionizable in water, such as sulfur dioxide, ammonia or chlorine.

The process may additionally comprise the step of treating the mat with a binder, such as fuseable polyester or polyvinyl acetate, for suitably maintaining the integrity of the mat. Alternatively, the mat can be sewn together.

An additional aspect of the present invention includes novel apparatus for the manufacture of oriented chopped fiber mats from a cascade of chopped nonconductive fiber feedstock. The apparatus comprises means for increasing the conductivity of the fiber feedstock, an electrically insulative transfer surface for receiving the fiber feedstock, and means for establishing and maintaining a directional electrical field above the transfer surface to orient the fibers of said cascade. The apparatus additionally comprises means for chopping continuous fiber feedstock to produce the cascade of chopped fibers. Additionally, the apparatus may comprise a mat-receiving surface positioned adjacent to the discharge end of the transfer surface to receive the oriented mat formed thereon.

The preferred means for controlling the conductivity of the fiber feedstock is a chamber adapted to permit the feedstock to pass therethrough, and having a means for controlling the temperature and relative humidity therein to condense moisture on such feedstock. Alternatively, the aforementioned claimed substances may be employed for increasing the conductivity of the feedstock.

The present invention also includes a nonwoven mat comprising a plurality of elongated nonconductive fibers having their longitudinal axes predominantly disposed parallel to a predetermined orientation axis lying in the plane of the mat. Preferably, the fibers are chopped glass fibers. The mat can additionally comprise a binder for suitably maintaining the integrity of the mat. Such orientation index ranging from approximately 2:1 to approximately 100:1. The "orientation index" is defined as the flexure modulus of elasticity along the orientation axis divided by the flexure modulus of elasticity perpendicular to the orientation axis. Random chopped mats have an orientation index of 1:1. This is because properties of random mats are isotropic in the plane of the mat.

BRIEF DESCRIPTION OF THE DRAWINGS

FIG. 1 is a perspective view of the apparatus constructed according to the principles of the present invention for producing oriented chopped fiber mats;

FIG. 2 is a schematic representation of a conductivity enhancement chamber for increasing the conductivity of continuous fiber feedstock;

FIG. 3 is a partial cross section on line 3—3 of FIG. 2 showing the construction of the conditioning chamber;

BEST MODE FOR CARRYING OUT THE INVENTION

Figure 4A:
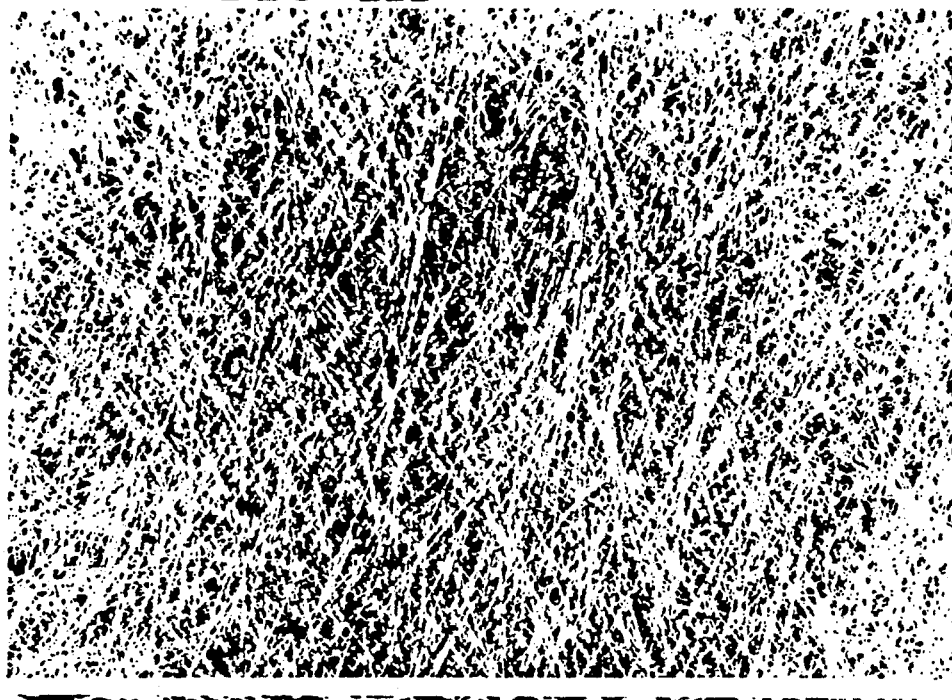
FIG. 4(a) is a photograph of a prior art random chopped glass fiber mat.

It is desirable to provide an oriented chopped fiber mat to provide directional reinforcing means to plastic structural components. Such components exhibiting directional strength characteristics are desirable to reduce the weight of the component while maintaining sufficient directional strength. The present invention teaches a method and apparatus for orienting chopped nonconductive fibers such as glass fibers to produce a mat for incorporation as reinforcement into such structural components.

The apparatus of the present invention provides means for increasing the conductivity of nonconductive fiber feedstock so that such feedstock exhibiting increased conductivity can be oriented in a directional electric field and deposited in an oriented fashion. The layers of chopped glass strands are formed into a handleable mat by the application of a binder, heat and pressure and subsequent incorporation as reinforcement in laminates.

Alternatively, the mats can be stitched together or sewn to maintain their integrity prior to and during impregnation with the matrix resin. Sewing facilitates rolling of the mats as well as forming them into irregular shapes. Sewn mats provide improved conformity to nonplanar molds when compared to mats having adhesive binders. Sewn mats also exhibit improved wetting because wicking of resin is facilitated by the absence of adhesive binders.

The apparatus for producing oriented chopped fiber mats is shown in FIGS. 1, 2 and 3. The apparatus 10 is mounted in a support frame structure 20 which supports four vertical panels 21 which define an orientation cell 22. The top and the bottom of said cell are open, and a chopper gun 23 is disposed at the top of the cell to provide a cascade of chopped fibers 24 from continuous strands 40 and 41.

The chopped fibers are permitted to fall by gravity through the orientation cell and are collected on a transfer belt or surface 25 which runs over a conveyor deck 26.

The transfer belt 25 is preferably transparent to the electric field. Preferably, a light urethane-impregnated polyester belt that is capable of passing over a $\frac{1}{8}''$ diameter nose bar is utilized. The conveyor deck is insulated to ensure that the high-voltage conductive rods 27, 28 and 29 remain electrically insulated from one another and to a possible ground in order to maintain a high electric field therebetween. The transfer belt transfers an oriented mat 30 formed thereon to a mat-receiving surface or caul (not shown) which is preferably maintained at ground potential and supported on a continuous conveyor belt driven by suitable power means (not shown). Alternatively, the mat can be transferred by an oscillating conveyor or by air suspension. A plurality of parallel rod electrodes 27, 28 and 29 are positioned beneath and adjacent to the upper surface of the transfer belt.

FIG. 1 shows the conductive rods 27, 28 and 29 aligned in a "cross-machine" direction. These electrodes create an electric field extending perpendicularly to the axes of the electrodes, causing orientation of the fibers parallel with the electric field. As used herein, the term "in-line" means in the direction of the travel of the mat formed by the apparatus shown, while "cross-machine" denotes an orientation 90° from in-line.

Each of the rods is charged with an appropriate potential such that an electric field is established between adjacent rods of sufficient intensity to electrostatically align the chopped fibers, as they fall through the orientation cell. The chosen magnitude of the voltage gradient between the spaced rods may vary depending upon fiber conductance, fiber geometry and basis weight. Voltage gradients ranging between 1 kV/in and 12 kV/in may be used. Direct current is preferred, although alternating current may also be used. If alternating current is employed, frequencies less than 60 Hz are preferred.

If the axes of the electrodes are rotated with respect to the direction of travel of the mats, the orientation axis of the fibers is concomitantly rotated. Therefore, if the electrodes shown in FIG. 1 were rotated 90° in the plane of the transfer deck 26, the orientation of the chopped fibers of the mat so produced would be considered "cross-machine." Of course, any desired angle of orientation can be achieved by adopting the appropriate angle of the axes of the electrodes with respect to the in-line direction of the mat produced.

Electrode contact with the mat in the presence of a voltage gradient between the electrodes causes an electric current to flow within the mat on the transfer belt or transfer surface 25 in a direction parallel to the desired orientation produces a directional, uniform electric field immediately above the mat. While under-belt electrodes 27, 28, and 29 are preferred, over-belt rotatable electrodes, corona wires below the belt, or ionizing radiation could be employed as alternatives for enabling the current flow within the mat.

The strength of the electrostatic field is limited by the breakdown voltage of the surrounding atmosphere. The present invention optionally contemplates the utilization of an additional pair of oppositely charged electrodes (not shown) disposed above the transfer belt 25, each having the same polarity as a conductive rod positioned below the transfer belt. Preferably, these additional electrodes are mounted directly above and parallel to the conductive rods 27, 28 and 29, each additional electrode having the same polarity as a conductive rod disposed directly beneath it. This arrangement allows an increase in the depth of the electrostatic field, thereby providing for additional orientation time. Preferably, these additional electrodes are rotating rods. Rotation of the rods prevents a build-up of the fibers cascading downwardly. Alternatively, stationary plate electrodes may be employed.

At the discharge end of the transfer conveyor belt, a grounded metal nose bar (not shown) is embedded in the tip of the transfer conveyor deck nosepiece. For in-line orientation, the distance between this rod and the rod preceding it is one-half of the distance between two adjacent high voltage rods. The metal rod is grounded to maintain the same strength of the electrical field that exists between two adjacent high voltage rods. This electric field maintains alignment of the chopped fibers as they are transferred toward the nosepiece of the transfer conveyor deck.

Disposed beneath the discharge end of the transfer conveyor belt is a corona wire (not shown) which stretches across the conveyor in close proximity to the metal nose rod. The corona wire is charged with alternating current at a voltage above the corona onset for the wire, generally ranging from 1,000 volts to 7,500 volts. The purpose of the field established thereby is to neutralize the charge on and to remove any residual chopped fibers from the transfer conveyor belt and to reduce or eliminate any residual charge on the belt. This arrangement provides for a clean separation of the mat from the transfer conveyor belt.

In the case of chopped glass fiber mats, the preferred feedstock is a pair of continuous glass fiber roving strands 40 and 41 from glass fiber creels 42. FIG. 2 depicts a schematic representation of a preferred apparatus for increasing conductance of the continuous glass fiber strands. This apparatus comprises a conductance enhancement chamber 44 consisting of a pair of vertically disposed cylindrical first and second tubes 46 and 48 which communicate at each end. The temperature and relative humidity within the tubes are carefully controlled.

A propane tank 50 provides fuel for a propane burner (not shown) which generates heat for an insulated boiler 51 for producing steam. Steam passes from the insulated boiler into the second tube 48, producing a high vapor pressure atmosphere. A circulating blower 54 causes circulation of the atmosphere within the interior of the first and second tubes. A hot water heater 56 provides thermostatically controlled hot water for circulation through spiral tubing or tracing 52 attached to the outer surface of the tubes. This closed circuit flow is maintained by water pump 58 and water reservoir 60.

The water temperature of the circulating water is controlled by a thermostat. The heated water is circulated by water pump 58 to elevate and maintain the temperature of the walls of the tubes 46 and 48 above the dew point. The hot water also provides a source of heat for elevating the air temperature within the tubes. Each chamber is covered with insulation 64 to reduce heat loss and maintain a constant surface temperature The temperature within the tubes may range from 110° F. to 400° F. The relative humidities within the tubes range from 30% to 100%.

In operation, an eccentric drive oscillates the chopper gun 23 in the cross machine direction about a pivot to distribute the glass strands across the width of the mat 30 and a pneumatic drive within the chopper gun pulls the continuous glass fiber robing strands 40 and 41 through the conductivity enhancement chamber 44 into the chopper gun. Roving feed rates may range from 100 to 3,000 feet per minute.

The feed rate of the continuous fibers, the temperature within the chamber, and the relative humidity within the chamber are all controlled to ensure that the conductivity of the glass fiber strands is increased above that of the non-treated, nonconductive strands. Preferably, the conductance of the strands is increased to a range of approximately 0.2 picosiemens to approximately 10 nanosiemens. This conductance increase is caused by deposition of a thin layer of water on the surface of the strands by condensation as the glass fiber roving passes through the enhancement chamber. This occurs because the temperature of the roving is below the dew point temperature of the chamber atmosphere. The strands are then immediately fed into the chopper gun 23 and reduced to a cascade of relatively uniform chopped fibers of a specified length. It is preferred that these fibers adjustably range in length from approximately 1/16th inch to approximately 6 inches. Alternatively, fibers of random length can be employed.

Fibers of a nonconductive nature may be employed in the present process. For example, polypropylene, extended chain polyethylene, aramid, polyamide, acronitrile, nylon, rayon, cotton, jute, sisal, wood, boron, ceramic and asbestos may be substituted for glass fibers. Adjustment of the temperature and relative humidity of the enhancement chamber and adjustment of the rate of feed of the feedstock would be within the skill of one familiar with the manufacture of chopped mats.

It is also contemplated that bulk chopped fiber feedstock could be employed, thus obviating the necessity for continuous fiber feedstock and chopping means. Additionally, it is within the scope of the present invention that chemical substances such as antistatic agents could be used to increase the conductivity of continuous fiber feedstock as well as bulk chopped fibers.

Substances which can be used include a wide variety of chemical compounds or mixtures of such compounds which have the effect of improving the conductance of the fibers. Such compounds include salts of weak acids, such as the alkali and alkaline earth metal carbonates, acetates, borates; gases which ionize in water, such as chlorine, sulfur dioxide, ammonia, etc.; ammonium salts of weak acids, such as ammonium carbonate or ammonium acetate; and quaternary ammonium salts, such as those having the general formula:

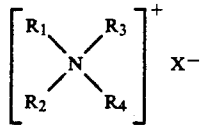

where:
X = halide or $CH_3SO_4$
$R_1$ and $R_2$ = $C_{8-22}$ alkyl radicals
$R_3$ and $R_4$ = $C_{1-4}$ alkyl radicals Specific quaternary ammonium compounds which may be used include, for example, di(hydrogenated tallow)dimethylammonium chloride (Arquad 2 HT-75); dioctadecyldimethylammonium chloride; and polyethoxylatedsterarylmethylammonium chloride. The substance or substances may be applied in different forms: (1) in molten or emulsion form, (2) in solution in a solvent therefor, or (3) as a gas (in the case of ammonia).

Treatment with gaseous ammonia or other conductance-enhancing gaseous compound or compounds is an ideal way to enhance the orientability of chopped fibers because it is quick, effective and inexpensive. Additionally, it leaves no residue, is not corrosive to iron (in the case of ammonia), and does not increase the moisture content of the mat.

EXAMPLE I

Manufacture of Oriented and Random Chopped Glass Fiber Mats and Composites

Oriented and random chopped glass fiber mats were produced according to the following process. Certain-Teed No. 292-207 roving was employed as feedstock. Two roving packages were utilized. The two rovings were passed through the enhancement chamber having a dry bulb temperature of 200° F. and a wet bulb temperature of 184° F. The relative humidity was maintained at 65%. A Glasscraft Model B-210 chopper gun was used to cut the roving to a nominal strand length of 1-½ inches. The chopper gun pneumatic pressure was maintained at approximately 64 psi. This resulted in a glass fiber roving speed of 772 feet per minute.

Figure 4B:
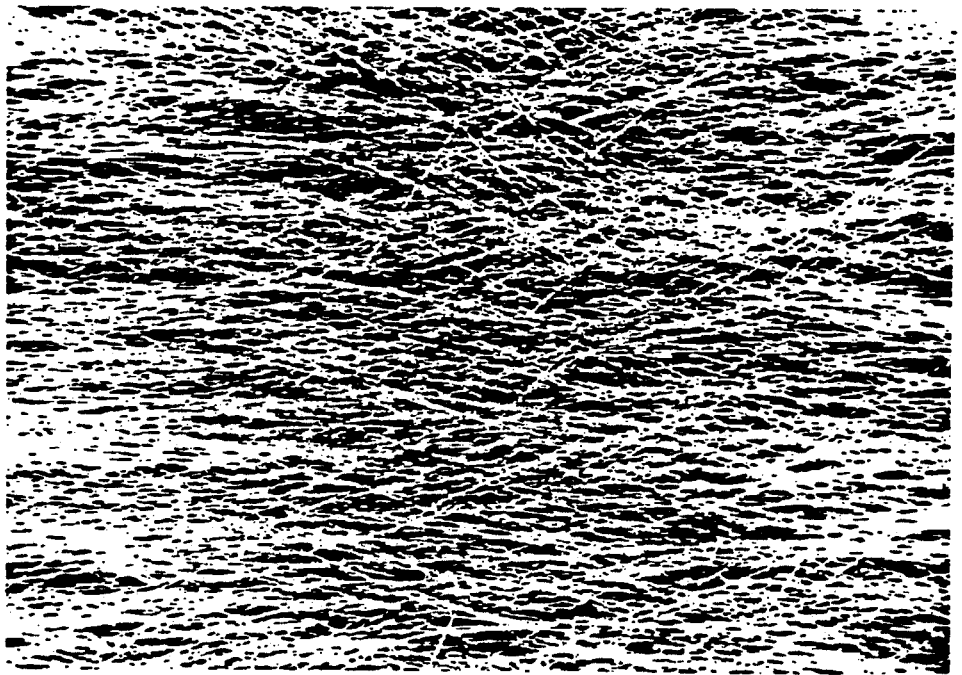
FIG. 4(b) is a photograph of an oriented chopped glass fiber mat produced according to the present invention.

An electric field strength of 6,500 volts per inch was maintained by the electrodes disposed beneath the transfer belt. These electrodes were oriented to selectively produce mats having: (1) an orientation in-line and (2) an orientation cross-machine (see FIG. 4a). Additionally, no voltage was applied to the electrode rods to produce random chopped fiber mats comparable to those of the prior art (see FIG. 4b).

All mats were produced at a forming line speed of approximately 18½ feet per minute, resulting in an approximately 26-inch wide mat having a basis weight of approximately 1½ ounces per square foot. The glass fiber flow rate through the apparatus was approximately 2½ pounds per minute.

The mats were then placed on a resin application conveyor line. One-half of the required water was sprayed on the top surface of the mat and then one-half of the required resin powder was delivered to the top of the mat via a vibrating resin feed. The mat was turned over and the other half of the required water and resin powder was deposited the bottom surface of the chopped fiber mat. The water permitted the resin powder to adhere to the surface of the chopped glass strands. The mats were then placed into a heated oven for evaporating the water and melting the resin. Atlac 363E, a fuseable polyester resin from I.C.I. Americas, Inc., was employed in the present examples. The resin added to the mat was approximately 3% of the mat weight. Water was added to the mat in an amount equaling 25 grams per square foot of mat surface. The oven was maintained at a temperature of 375° F. and the mats were heated in the oven for approximately 20 minutes.

After removal from the oven, the mats were rolled with a cool 30-pound metal roll to consolidate the fibers in the mat and solidify the resin. These mats were then trimmed.

To determine the influence of fiber alignment on the properties of chopped glass fiber-reinforced plastic composites, test panels were made by compression molding techniques. The techniques employed for making these panels was similar for both the oriented and random panels. A two-piece, 18-inch square mold having a cavity thickness of 1/10th of an inch was used. Prior to its utilization, the mold was treated with mold release to facilitate removal of the composite. Four layers of mat reinforcement were employed in each case. Approximately 6.6 ounces of resin per square foot were applied to each composite. The resin utilized was Owens-Corning Polyester for the results obtained and shown in Table 1, and Derakane 411-45 for the results obtained and shown in Table 2. Each of the four reinforcing mats was positioned in the mold and covered by approximately ¼ of the total resin used. The resin was rolled with a flexible grooved roller to spread the resin over as much of the mat area as practical. The procedure was repeated until all four mats had been placed into the mold.

The mold was closed and placed into a heated press. Pressing was accomplished by increasing the pressure in stages to prevent resin washing. Pressing was accomplished in five incremental steps of approximately 15 to 20 seconds duration until the proper part thickness was obtained. Maximum pressure required was approximately 100 psi. Press time of one hour was used at a platen temperature of approximately 300° F. The glass fiber composite was then removed from the mold and allowed to cool for at least 24 hours prior to cutting test specimens from the panel. Test panels were approximately 1/10th of an inch thick and had a specific gravity of approximately 1.59 for a 50% glass content.

EXAMPLE II

Testing of the Chopped Glass Fiber-Reinforced Composites

The MOE orientation index of the random and oriented chopped glass fiber mats was measured nondestructively with the Metriguard Model 239A Stress Wave Timer prior to incorporation into a glass fiber composite. The orientation index of oriented mats utilized in the test results was approximately 19.4:1.

Table 1 presents test results comparing oriented glass fiber composites with prior art random glass fiber composites. Also presented are data derived from testing oriented chopped glass fiber mats wherein adjacent reinforcing mats are oriented at right angles, quasi-isotropic.

The data show that tensile properties were the same in both in-line and cross-machine directions for composites made from random chopped mats. By contrast, tensile properties of composites made from oriented chopped mats were greater parallel to the direction of orientation than perpendicular to such orientation. Tensile strength parallel to the orientation axis of the reinforcement mats was 52% greater than that of the randomly chopped mats. All tensile strength measurements were made pursuant to ASTM D 638-84 "Standard Test Method for Tensile Properties of Plastics."

Composites made from alternating layers of oriented chopped fiber mats aligned at right angles served as a control and exhibited properties similar to random chopped mats, as tensile properties were uniform in both directions.

TABLE 1

| type of glass fiber chopped mat in composite | testing direction | tensile strength psi × $10^3$ | tensile modulus psi × $10^6$ |
|---|---|---|---|
| random chopped glass fiber mat | in-line | 23.2 | 1.64 |
|  | cross-machine | 25.2 | 1.82 |
| oriented chopped glass fiber mat | in-line | 36.8 | 2.70 |
|  | cross-machine | 4.7 | 0.90 |
| oriented chopped glass fiber mat alternate 0°, 90° four layers | in-line | 24.6 | 1.88 |
|  | cross-machine | 24.2 | 1.68 |

Note: All composites comprised 50% glass fiber by weight.

Table 2 compares tensile and flexural properties of a second set of composites made according to the present invention with composites made from two commercially available random glass fiber chopped mats. All flexure measurements were made pursuant to ASTM D 790-84a "Standard Test Methods for Flexural Properties of Unreinforced and Reinforced plastics and Electrical Insulating Materials." Tensile tests were made pursuant to ASTM D 638-84 "Standard Test Method for Tensile Properties of Plastics." The percent by weight of glass fiber of these mats varied from 36% to 41%. Composite strength increased in proportion with increasing glass fiber content. The glass fiber content of the composites from oriented chopped mats was higher than that of random chopped mats because aligned glass fiber strands allowed glass fiber reinforcement to be packed more tightly into a given volume of composite.

All results were in the in-line direction. Tensile strength of composites of the present invention averaged 99% higher while flexure strength averaged 100% higher than values obtained from prior art composites of random chopped mats.

TABLE 2

| type of glass fiber chopped in composite | percent glass fiber | testing direction | tensile strength psi × $10^3$ | tensile modulus psi × $10^6$ | flexure strength psi × $10^3$ | flexure modulus psi × $10^6$ |
|---|---|---|---|---|---|---|
| random chopped glass fiber mat | 36.1 | in-line | 21.9 | 1.46 | 36.0 | 1.40 |
| oriented chopped glass fiber mat | 41.2 | in-line | 42.2 | 2.20 | 67.0 | 2.36 |
| Commercial #A random chopped glass fiber mat | 33.9 | in-line | 22.2 | 1.59 | 30.6 | 1.40 |
| Commercial #B random chopped glass fiber mat | 39.5 | in-line | 19.4 | 1.39 | 33.5 | 1.32 |

While particular embodiments of the invention have been shown and described, it should be understood that the invention is not limited thereto since many modifications may be made. It is therefore contemplated to include in the present invention any and all such modifications as fall within the true spirit and scope of the underlying claims.

We claim:

1. A process of manufacturing a nonwoven mat from electrically nonconductive fiber feedstock, comprising the steps of:
   increasing the conductivity of said feedstock by condensation of a gas containing electrical conductive material on the fiber feedstock to form treated fibers that are conductive;
   chopping said feedstock into fibers of a predetermined length;
   causing said treated fibers to fall under the influence of gravity through a directional electric field of sufficient strength to orient the fibers substantially parallel to a predetermined orientation axis;
   collecting said oriented fibers on a transfer surface to create an oriented, nonwoven mat; and
   causing an electric current to flow within said mat on said transfer surface to produce a directional electric field immediately above said mat substantially parallel to the desired orientation.

2. The process of claim 1 wherein the conductance of the treated fibers ranges from approximately 0.2 picosiemens to approximately 10 nanosiemens.

3. The process of claim 1 wherein the fibers are selected from the group consisting of glass fibers, polypropylene, extended chain polyethylene, aramid, polyamide, acronitrile, nylon, rayon, cotton, jute, sisal, wood, boron, ceramic and asbestos.

4. The process of claim 1 wherein the feedstock is glass fibers and a step of increasing the conductivity of said feedstock comprises the condensation of moisture on the fiber feedstock by passing the feedstock through a temperature- and humidity-controlled chamber.

5. The process of claim 4 wherein the temperature within the chamber is maintained in a range from approximately 100° F. to approximately 400° F.

6. The process of claim 4 wherein the relative humidity maintained within the chamber ranges from approximately 30% to approximately 100%.

7. The process of claim 1 wherein the step of increasing the conductivity of the fiber feedstock comprises pretreatment of the feedstock with a gas containing water to condense water from said gas on said fiber feedstock.

8. The process of claim 1 wherein the step of chopping said feedstock into fibers of a predetermined length comprises employing cuter apparatus having a rotatable cutter head including a plurality of circumferentially disposed knives for cutting the feedstock to a predetermined length.

9. The process of claim 8 wherein the fibers range in length from approximately 1/16 inch to approximately 6 inches.

10. The process of claim 1, additionally comprising, after the step of collecting said oriented fibers on a moving surface to create a nonwoven mat, the step of treating said mat with a binder for suitably maintaining the integrity of the mat.

11. The process of claim 10 wherein the mat is characterized as having anisotropic moduli of elasticity in tension and flexure within the plane of the mat.

12. The process of claim 10 wherein the mat is characterized as having an orientation index ranging from approximately 2:1 to approximately 100:1.

13. The process of claim 1 wherein the electric field has a strength ranging from approximately 1000 volts/inch to approximately 12,000 volts/inch.

14. The process of claim 1 wherein the mat-receiving surface is a motor-driven endless belt.

15. A process of manufacturing a nonwoven mat from the electrically nonconductive fiber feedstock, comprising the steps of:
increasing the conductivity of said feedstock by treating the fiber feedstock with electrical conductive material which includes an antistatic compound;
chopping said feedstock into fibers of a predetermined length;
causing said treated fibers to fall under the influence of gravity through a directional electric field of sufficient strength to orient the fibers substantially parallel to a predetermined orientation axis;
collecting said oriented fibers on a transfer surface to create an oriented, nonwoven mat; and
causing an electric current to flow within said mat on said transfer surface to produce a directional electric field immediately above said mat substantially parallel to the desired orientation.

16. The process of claim 15 wherein the antistatic compound is selected from the group consisting of the salts of weak acids, acetates, borates, fatty acid amides, ammonium salts of weak acids, and quaternary ammonium compounds containing inorganic radicals.

17. A process of manufacturing a nonwoven mat from electrically nonconductive glass fiber feedstock, comprising the steps of:
increasing the conductivity of said feedstock by condensation of moisture on the glass fiber feedstock to form a treated feedstock that is conductive;
chopping said feedstock into fibers of a predetermined length;
causing said treated fibers to fall under the influence of gravity through a directional electric field of sufficient strength to orient the fibers substantially parallel to a predetermined orientation axis;
collecting said oriented fibers on a transfer surface to create an oriented, nonwoven mat; and
causing an electric current to flow within said mat on said transfer surface to produce a directional electric field immediately above said mat substantially parallel to the desired orientation.

* * * * *